(12) United States Patent
Deng et al.

(10) Patent No.: US 12,712,481 B2
(45) Date of Patent: Aug. 18, 2026

(54) UBIQUITOUS ENERGY FUSION AND HARVESTING SYSTEM

(71) Applicant: Beijing Institute of Technology, Beijing (CN)

(72) Inventors: Fang Deng, Beijing (CN); Xiangyang Wang, Beijing (CN); Hailing Fu, Beijing (CN); Ning Ding, Beijing (CN); Yeyun Cai, Beijing (CN); Bowei Xie, Beijing (CN); Maobin Lv, Beijing (CN); Jiadong Zhou, Beijing (CN); Shoujun Zheng, Beijing (CN); Chen Chen, Beijing (CN); Minmin Liang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 47 days.

(21) Appl. No.: 18/928,922

(22) Filed: Oct. 28, 2024

(65) Prior Publication Data

US 2025/0175113 A1 May 29, 2025

(30) Foreign Application Priority Data

Nov. 24, 2023 (CN) ........................ 202311581703.3

(51) Int. Cl.
*H02S 10/30* (2014.01)

(52) U.S. Cl.
CPC .................................. *H02S 10/30* (2014.12)

(58) Field of Classification Search
None
See application file for complete search history.

(56) References Cited

U.S. PATENT DOCUMENTS

2021/0099127 A1* 4/2021 Damaraju ................. B60L 1/20
2023/0137071 A1* 5/2023 Lal ......................... H02N 2/186 235/470

* cited by examiner

*Primary Examiner* — Daniel P Malley, Jr.
(74) *Attorney, Agent, or Firm* — Hawaii Patent Services; Nathaniel K. Fedde; Kenton N. Fedde

(57) ABSTRACT

The present disclosure provides a ubiquitous energy fusion and harvesting system, formed into a hexahedron by splicing light-heat-radio frequency (RF) fusion energy-harvesting devices, light-heat-kinetic-RF fusion energy-harvesting devices, and a heat-dissipating circuit board. The system can adapt to multi-directional and all-time solar energy harvesting, and multi-band and omnidirectional RF energy harvesting, avoiding insufficient output of electric energy in a harsh environment of single energy harvesting. In the present disclosure, a solar cell sheet serves to provide a heat source for a temperature difference power generation sheet, and a piezoelectric power generation array serves as a cooling fin to cool the temperature difference power generation sheet, realizing a multi-source ubiquitous energy composite harvesting and conversion with mechanism fusion and spatial mutual benefit.

20 Claims, 4 Drawing Sheets

UBIQUITOUS ENERGY FUSION AND HARVESTING SYSTEM

CROSS-REFERENCE TO RELATED APPLICATION

This application claims priority of Chinese Patent Application No. 202311581703.3, filed on Nov. 24, 2023, the entire contents of which are incorporated herein by reference.

TECHNICAL FIELD

The present disclosure specifically relates to a ubiquitous energy fusion and harvesting system, falling within the technical field of hybrid energy harvesting for new energy.

BACKGROUND

Internet of things (IoT) technology plays a key role in the development of digitalization and intelligence in fields such as wild monitoring, smart homes, smart cities and smart factories, and is especially significant in enhancing productivity, reducing costs and improving quality of life. An increasing number of IoT multi-sensor smart terminals in the form of "smart dust" are applied in health monitoring, environment sensing and digital twin. While IoT technology promotes digitalization and intelligence, it also risks multiple development bottlenecks such as sustainable autonomous energy supply. Currently, widely distributed IoT nodes still need to be charged frequently and artificially, and how to provide reliable electric energy supply for sensing and monitoring nodes is a key challenge that IoT technology still is undergoing.

As ubiquitous energy harvesting technologies for renewable energy sources such as solar energy, heat energy, mechanical energy, and radio frequency (RF) energy experience continuous development, more ways such as single-energy and multi-energy hybrid harvesting are pursued for harvesting and utilizing those energy. Utilizing the available energy in the environment to autonomously power the smart dust through energy harvesting technology provides a new sustainable energy supply idea. However, due to the variability and uncertainty of energy in the natural environment, the single-energy harvesting technology is limited in power output and poor in stability, and it is difficult to realize the self-powered operation of the smart terminals, which results in the realization of passive IoT still suffering challenges such as usability and reliability. The existing hybrid energy harvesting apparatuses mainly integrate multiple types of energy exchange mechanisms spatially, but there is still a lack of systematic design for collaborative design, mutual coupling compensation, space sharing, and life cycle matching between different energy harvesting components for ubiquitous energy. For example, Yu Shijie, in "A Multi-Source Composite Micro-Energy System and Control Method", integrates a triple environmental energy harvesting mechanism, namely a photovoltaic power generation apparatus, a heat energy power generation apparatus and an FR power generation apparatus, which can improve the adaptability in different environments. However, due to the spatial and temporal anisotropy of ubiquitous energy in the natural environment, the hybrid energy harvesting system integrated by simple spatial splicing is low in energy conversion efficiency, and is insufficient in power generation and limited in load-carrying capacity in the spatially-constrained and harsh natural environments.

SUMMARY

In response to the above problems, the present disclosure provides a ubiquitous energy fusion and harvesting system that integrates and fuses harvesting devices for four ubiquitous energy resources, namely, light energy, heat energy, mechanical energy and RF energy in the natural environment, realizing efficiently harvesting of multi-source composite energy with mechanism fusion and mutual spatial benefit, and providing electric energy for a variety of low-power electronic apparatuses.

A ubiquitous energy fusion and harvesting system includes light-heat-RF fusion energy-harvesting devices, light-heat-kinetic-RF fusion energy-harvesting devices, and a circuit board, a total of six pieces of the light-heat-RF fusion energy-harvesting devices, the light-heat-kinetic-RF fusion energy-harvesting devices and the heat-dissipating circuit board being spliced to form a hexahedral structure;

- the light-heat-RF fusion energy-harvesting devices serve to realize photovoltaic power generation, temperature difference power generation, and RF energy power generation;
- the light-heat-kinetic-RF fusion energy-harvesting devices serve to realize photovoltaic power generation, temperature difference power generation, RF energy power generation, and kinetic energy power generation; and
- the circuit board serves to deploy energy storage elements and electric energy management circuits, and manage and store electric energy generated by the light-heat-RF fusion energy-harvesting devices and the light-heat-kinetic-RF fusion energy-harvesting devices.

Preferably, in the hexahedral structure, the number of the light-heat-kinetic-RF fusion energy-harvesting devices is 1 or 2, the number of the circuit board is 1, and the rest are the light-heat-RF fusion energy-harvesting devices.

Preferably, the light-heat-RF fusion energy-harvesting device is formed by sequentially and tightly attaching a solar cell sheet, a hot-end heat-conducting layer, an FR antenna, a temperature difference power generation sheet, a cold-end heat-conducting layer, and a cooling sheet.

Preferably, an expansion area is arranged around the temperature difference power generation sheet, and the RF antenna is arranged on the expansion area.

Preferably, the light-heat-kinetic-RF fusion energy-harvesting device is formed by sequentially and tightly attaching a solar cell sheet, a hot-end heat-conducting layer, an FR antenna, a temperature difference power generation sheet, a cold-end heat-conducting layer, and piezoelectric array cooling sheets; and the piezoelectric array cooling sheet includes an aluminum substrate base, a transverse piezoelectric fin array and a vertical piezoelectric fin array; and the transverse piezoelectric fin array and the vertical piezoelectric fin array are deployed on one side of the aluminum substrate base in a checkerboard pattern.

Preferably, a piezoelectric fin includes a piezoelectric sheet and a mass block; and the piezoelectric sheet is encapsulated or coated with an insulating and heat-conducting material, with a bottom thereof being fixedly connected to the aluminum substrate base, and a head thereof being loaded with the mass block.

Preferably, a plurality of cooling fins are tightly bonded to a back face of the heat-dissipating circuit board via the heat-conducting layer, and the circuit board serves to deploy the energy storage elements and the electric energy management circuits.

Preferably, the circuit board is in hollow-carved design.

Preferably, the energy storage element is a flexible super-capacitor, an ordinary super-capacitor, a lithium battery or a storage battery, and serves for storing electric energy harvested by a system.

Preferably, an aluminum substrate is used as a base for a hot end of the temperature difference power generation sheet.

Preferably, the RF antenna is designed with a multi-layer printed circuit board (PCB) to provide a continuous and uniform ground plane below the antenna, with an impedance matching network placed at a bottom layer; and the RF antenna is typically designed as a patch antenna in a shape of a combination of Koch curves and geometrical curves as well as a micro-strip antenna, depending on the frequency of RF signals in the environment.

The present disclosure has the following advantageous effects.

(1) In the present disclosure, the light energy, heat energy, mechanical energy and electromagnetic wave energy widely distributed in the natural environment are comprehensively considered, and the solar cell sheet is utilized to provide a heat source for the temperature difference power generation sheet, the temperature difference power generation sheet provides a deployment space for harvesting the RF energy, and the piezoelectric power generation array serves as a fin to cool the temperature difference power generation sheet, realizing the multi-source ubiquitous energy composite harvesting and conversion with mechanism fusion and spatial mutual benefit. Compared with multi-source energy harvesting systems with a discrete structure, the system of the present disclosure is improved in power generation efficiency, space utilization rate, and structural compactness, and is of more applicable value.

(2) In the present disclosure, a hot end structure of the temperature difference power generation sheet is designed innovatively, which combines the design of heat transfer, RF antenna deployment, device wire distribution, and device splicing and expansion, facilitating the realization of multi-band and multi-directional RF energy harvesting, as well as the integration of multi-source energy-harvesting devices in the system.

(3) In the present disclosure, a heat-dissipating structure of the temperature difference power generation sheet is designed innovatively, and the piezoelectric power generation array serves as the cooling fin, realizing the spatial mutual benefit between a temperature difference power generation system and a kinetic energy harvesting system. At the same time, the vibration of the piezoelectric array causes the airflow circulation between the fins, which substantially increases the heat dissipation efficiency, realizing the mutual benefit and fusion of mechanisms between the temperature difference power generation and the kinetic energy harvesting. The heat dissipation effect of the cooling fin in the present disclosure is much better than that of the ordinary cooling sheets.

(4) In the present disclosure, the piezoelectric power generation array is used as the cooling fin to realize the spatial mutual benefit between the temperature difference power generation system and the kinetic energy harvesting system, and at the same time, the vibration of the piezoelectric array causes the air circulation between the fins, which greatly increases the heat dissipation efficiency while reducing the length of the cooling fins on the side, improving the utilization rate of the space, realizing the mutual benefit and fusion of mechanisms between the temperature difference power generation and the kinetic energy harvesting. The heat dissipation effect of the cooling fin in the present disclosure is much better than that of the ordinary cooling sheets.

(5) In the present disclosure, the circuit board is in hollow-caved design to provide a good airflow circulation loop for the vibration of the piezoelectric array cooling sheet, ensuring the heat dissipation efficiency of a heat dissipation structure in the system; and the circuit board is bonded to the cooling fin via the heat-conducting layer to further increase the heat dissipation area, which further improves the system's internal heat dissipation.

(6) All the bonding surfaces between the components of the present disclosure have a heat-conducting layer of heat-conducting silicone grease, ensuring that the bonding surfaces can be in close contact with each other, to reduce heat resistance and enhance the effect of heat conduction.

(7) In the present disclosure, ubiquitous energy fusion and harvesting is realized, and a hexahedral encapsulation structure is employed, which can adapt to multi-directional and full-time solar energy harvesting, multi-band and omnidirectional RF energy harvesting, and multi-dimensional vibration energy harvesting, avoiding the insufficient output of electric energy in the harsh environment of single-energy harvesting, and providing a guarantee for maintaining a long-term, autonomous, and stable operation of the low-power electronic apparatuses for IoT and other applications.

BRIEF DESCRIPTION OF THE DRAWINGS

FIG. 3(*b*) is a schematic structural diagram of a single piezoelectric fin in the piezoelectric array cooling sheet according to the present disclosure.

Figure 1:
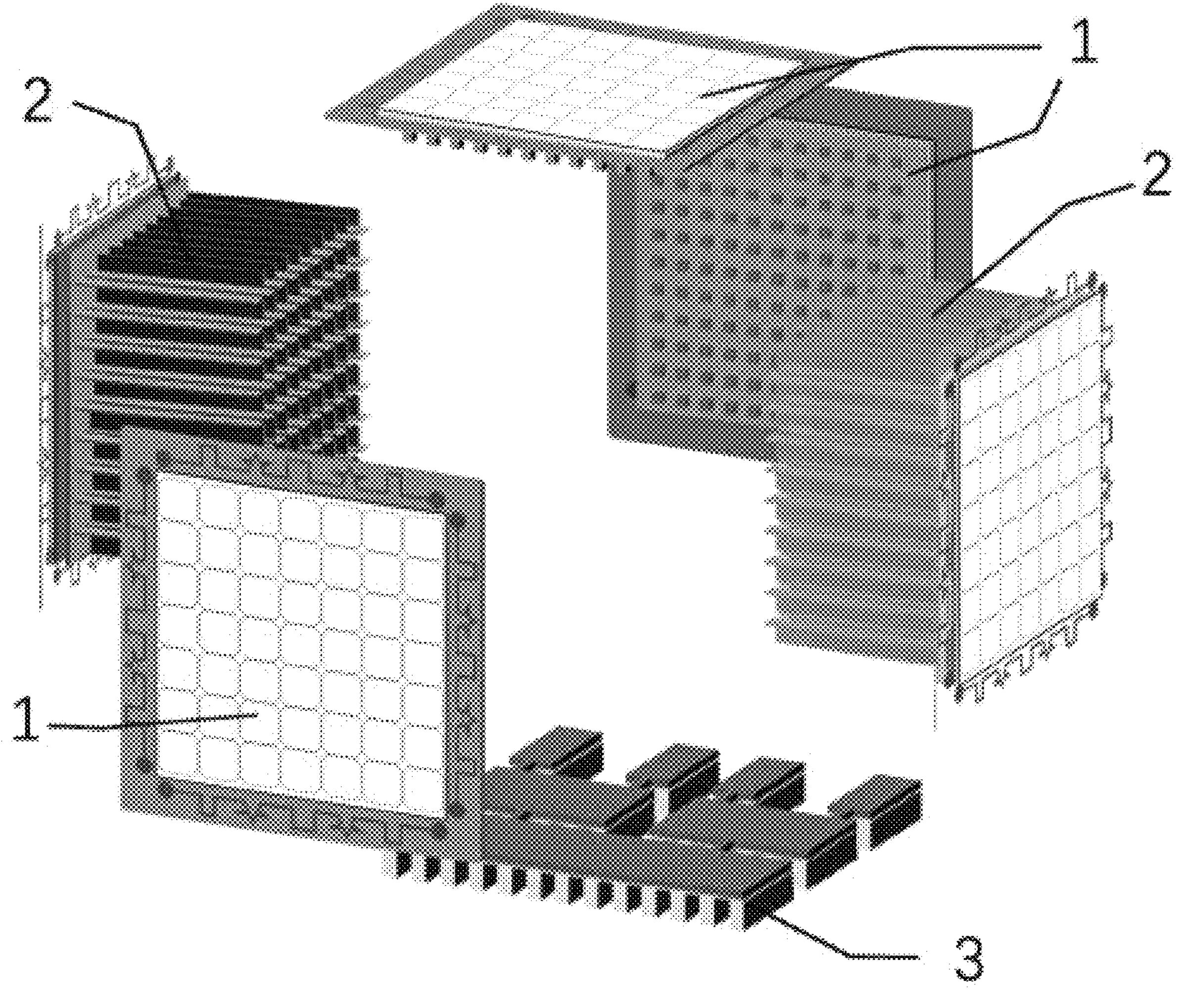
FIG. 1 is a schematic structural diagram of a ubiquitous energy fusion and harvesting system according to the present disclosure.

Reference numerals and denotations thereof: 1—light-heat-RF fusion energy-harvesting device, 101—solar cell sheet, 102—hot-end heat-conducting layer, 103—temperature difference power generation sheet, 104—RF antenna, 105—cold-end heat-conducting layer, 106—cooling sheet, 2—light-heat-kinetic-RF fusion energy-harvesting device, 201—aluminum substrate base, 202—transverse piezoelectric fin array, 203—vertical piezoelectric fin array, 204—piezoelectric sheet, 205—insulating and heat-conducting encapsulation, 206—mass block, 3—heat-dissipating circuit board, 301—circuit board, 302—heat-conducting layer, and 303—cooling fin.

DETAILED DESCRIPTION

The present disclosure will be described by reference to the accompanying drawings in detail below.

Figure 2:
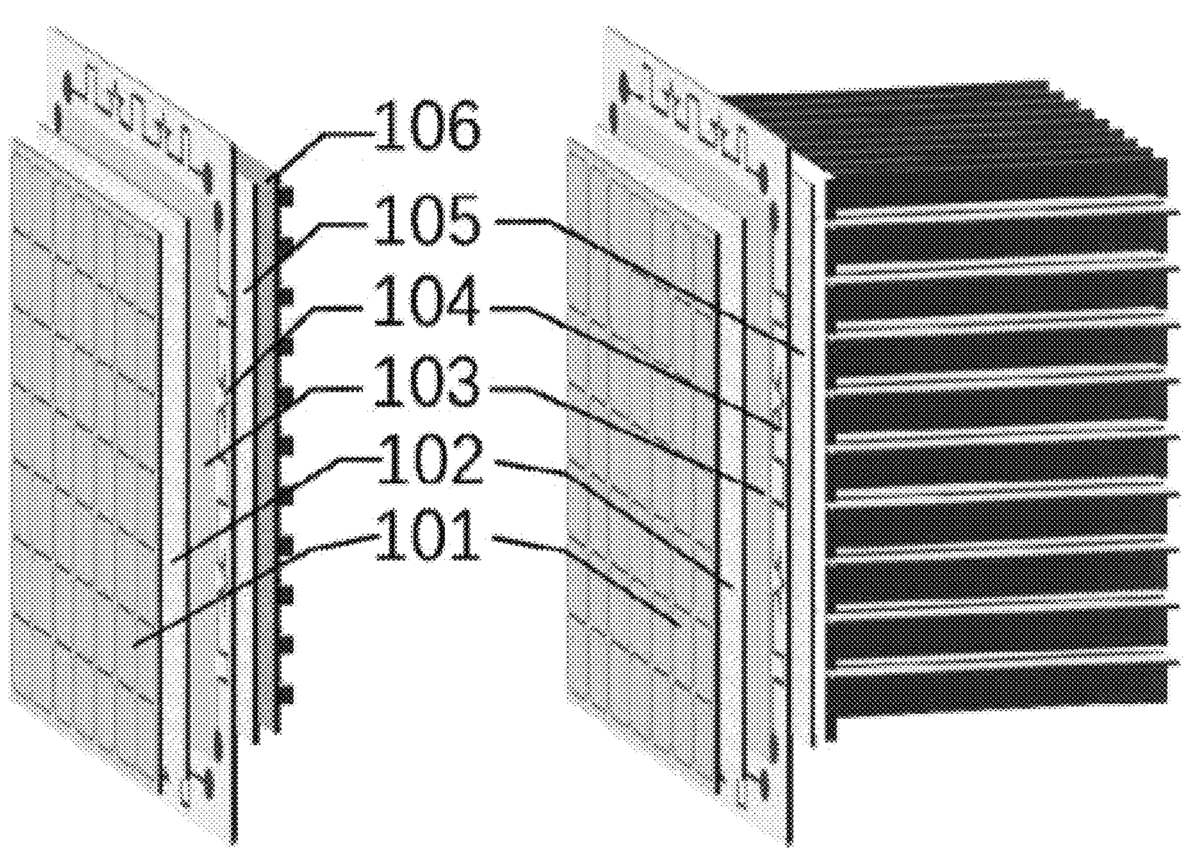
FIG. 2 is a schematic structural diagram of a light-heat-RF fusion energy-harvesting device and a light-heat-kinetic-RF fusion energy-harvesting device.
Figure 3A:
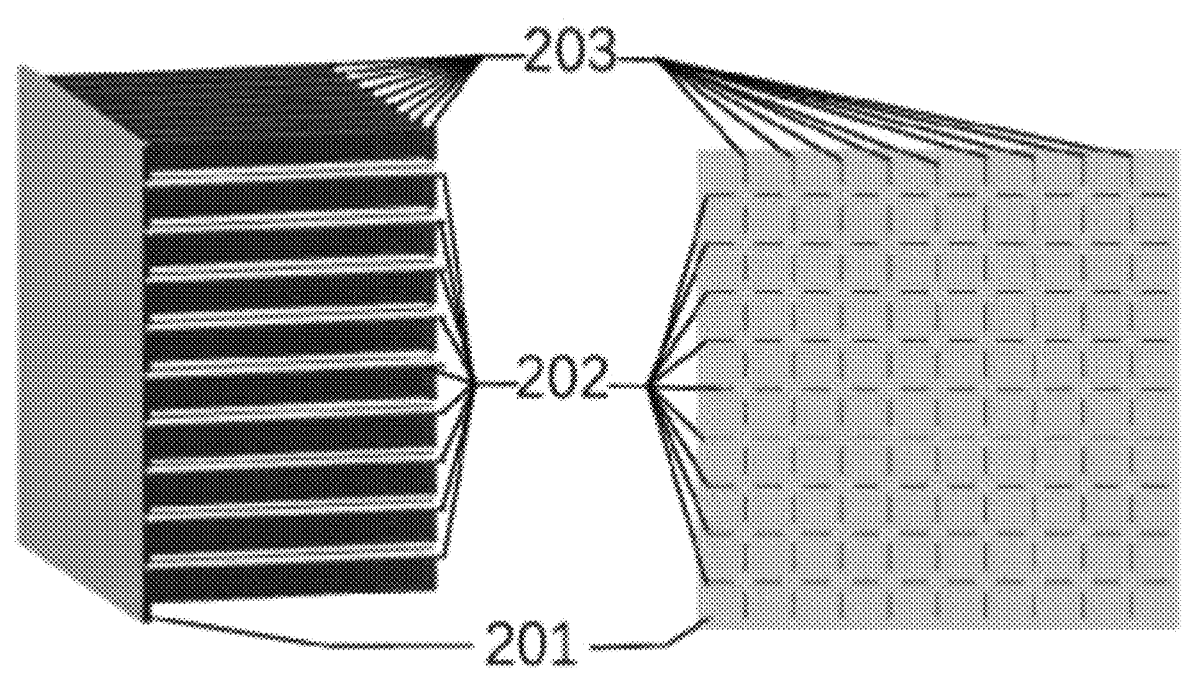
FIG. 3(*a*) is a schematic structural diagram of a side face and a back face of a piezoelectric array cooling sheet according to the present disclosure.
Figure 3B:
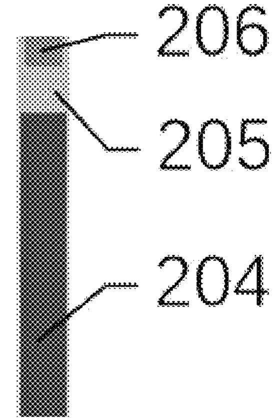
Figure 4:
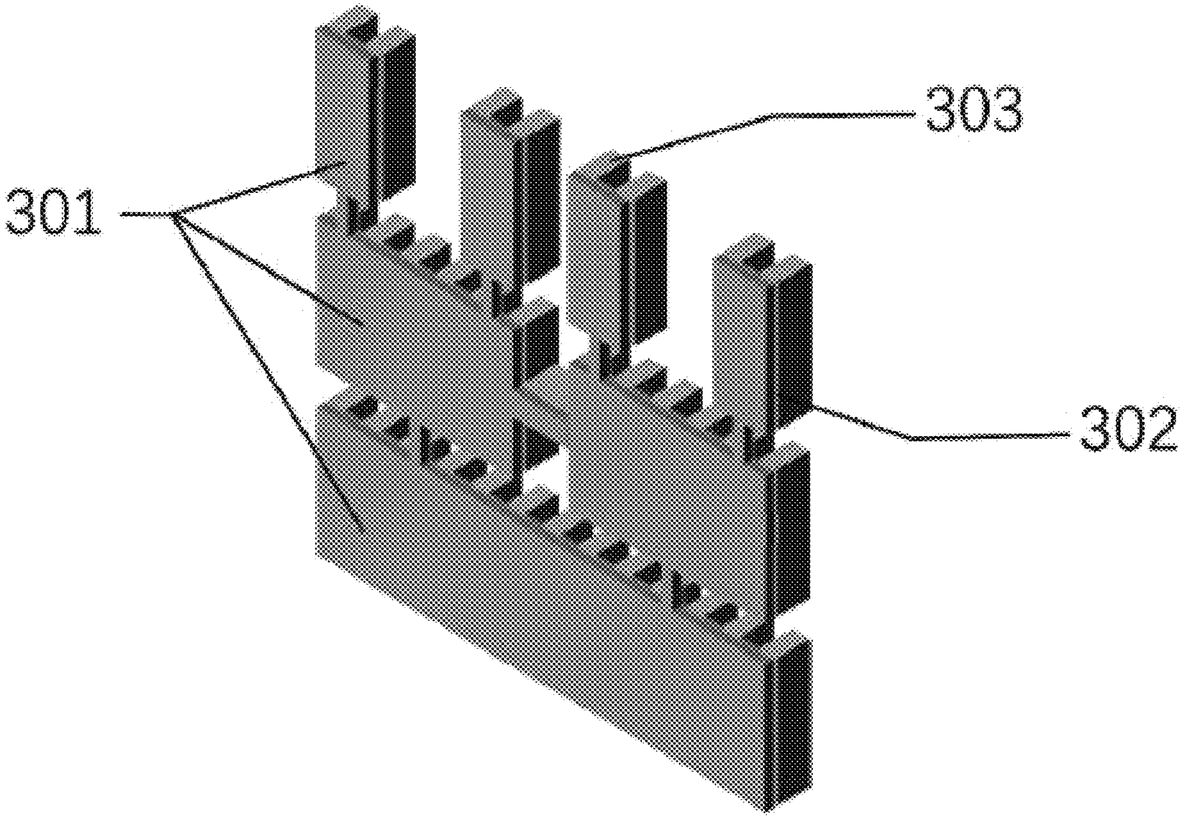
FIG. 4 is a schematic structural diagram of a heat-dissipating circuit board according to the present disclosure.

FIG. 1 is a schematic structural diagram of a ubiquitous energy fusion and harvesting system. FIG. 2 is a schematic structural diagram of a light-heat-RF fusion energy-harvesting device. FIGS. 3(*a*)-3(*b*) are schematic structural diagrams of a piezoelectric array cooling sheet. FIG. 4 is a schematic structural diagram of a heat-dissipating circuit board. A ubiquitous energy fusion and harvesting system of this example includes three light-heat-RF fusion energy-harvesting devices 1, two light-heat-kinetic-RF fusion energy-harvesting devices 2, and a heat-dissipating circuit board 3. The light-heat-RF fusion energy-harvesting device 1 includes a solar cell sheet 101, a hot-end heat-conducting layer 102, a temperature difference power generation sheet 103, an RF antenna 104, a cold-end heat-conducting layer 105, and a cooling sheet 106. The light-heat-kinetic-RF fusion energy-harvesting device 2 includes a solar cell sheet 101, a hot-end heat-conducting layer 102, a temperature difference power generation sheet 103, an RF antenna 104, a cold-end heat-conducting layer 105, an aluminum substrate base 201, a transverse piezoelectric fin array 202, and a vertical piezoelectric fin array 203. The piezoelectric fin includes a piezoelectric sheet 204, an insulating and heat-conducting encapsulation 205, and a mass block 206. The heat-dissipating circuit board 3 includes a circuit board 301, a heat-conducting layer 302, and cooling fins 303.

In the present disclosure, the structure of the ubiquitous energy fusion and harvesting system is shown in FIG. 1. In a preferred solution of the present disclosure, the ubiquitous energy fusion and harvesting system has a hexahedral structure, with three light-heat-RF fusion energy-harvesting devices 1 being arranged on the front, top, and back sides of the system, respectively, and two light-heat-kinetic-RF fusion energy-harvesting devices 2 being arranged on the left and right sides of the system, and a heat-dissipating circuit board 3 being arranged on the bottom face, and those devices are spliced through bonding pads reserved along the edges of the devices, realizing electrical connection and electric energy transmission.

In a preferred solution of the present disclosure, the light-heat-RF fusion energy-harvesting device 1 and the light-heat-kinetic-RF fusion energy-harvesting device 2 can be deployed to the structure of the ubiquitous energy fusion and harvesting system, with their numbers and positions being determined according to the actual demand. For example, when the installation space is restricted, one surface is selected to deploy with one light-heat-kinetic-RF fusion energy-harvesting device, and the rest of the surfaces are deployed with the light-heat-RF fusion energy-harvesting device, to ensure that the piezoelectric fin arrays 202 and 203 are provided with sufficient space for vibration, which will be more conducive to kinetic energy harvesting and heat dissipation airflow circulation.

The light-heat-RF fusion energy-harvesting device 1 realizes the integration of a photovoltaic power generation unit, a temperature difference power generation unit, and an RF energy harvesting unit, for collecting the light energy, heat energy, and electromagnetic wave energy that are ubiquitous in the environment in which the system is located. As shown in FIG. 2, the light-heat-RF fusion energy-harvesting device 1 is formed by sequentially and tightly attaching the solar cell sheet 101, the hot-end heat-conducting layer 102, the temperature difference power generation sheet 103, the FR antenna 104, the cold-end heat-conducting layer 105, and the cooling sheet 106.

Further, the solar cell sheet 101 serves to harvest light energy such as sunlight and artificial light in the environment and converted them into electric energy, and silicon solar cell sheets, thin-film solar cells, perovskite solar cell sheets and the like may be selected according to the actual environmental photovoltaic illumination. Taking into account the demand for the use of temperature difference power generation sheets, preferably, a photovoltaic cell having a high absorption rate of heat radiation is better selected as the solar cell sheet 101.

Further, the hot-end heat-conducting layer 102 and the cold-end heat-conducting layer 105 serve to bond the hot-end of the temperature difference power generation sheet 103 to the back of the solar cell sheet 101, and the cold end of the temperature difference power generation sheet 103 to the cooling sheet 106, respectively, for heat transfer. Preferably, bonding agents with excellent heat-conducting property are selected, such as heat-conducting silicone grease, heat-conducting silica gel, heat-conducting polymers, heat-conducting paste, and the like.

Further, the RF antenna 104, which serves to harvest RF electromagnetic waves from the environment and convert them into electric energy, is deployed around the heat transfer expansion area at the hot end of the temperature difference power generation sheet 103, and is designed in layers using a PCB to provide a continuous and uniform ground plane below the antenna, with an impedance matching network placed at the bottom layer. In a preferred solution of the present disclosure, according to the frequency of the RF signals in the environment, the RF antenna 104 may typically be designed as a patch antenna in a shape of a combination of Koch curves and geometric curves, as well as a micro-strip antenna that is easily printed on the surface of the area to accommodate a compact design with spatial mutual benefit with the hot end of the temperature difference power generation sheet.

Further, in a preferred solution of the present disclosure, the temperature difference power generation sheet 103 serves to convert the heat energy absorbed by the solar cell sheet 101 into electric energy, and is structurally different from the conventional ceramic temperature difference power generation sheet. An aluminum substrate with excellent heat-conducting property is used as a base for the hot end of the temperature difference power generation sheet 103, and at the same time the circuit board prototyping is utilized to complete the serial and parallel arrangement of semiconductor grains of the temperature difference power generation sheet, to increase the heat transfer efficiency between the grains and the solar cell sheet. At the same time, the hot-end expansion area with the aluminum substrate as a base facilitates the deployment of RF antennas, wires, bonding pads, etc., to achieve the wire deployment for each energy-harvesting unit of the light-heat-RF fusion energy-harvesting device 1 as well as the soldering or bonding of devices, but is not limited to the selection of the aluminum substrate as a base.

Further, the cooling sheet 106 has excellent heat-conducting property, and its smooth surface on one side is adhered to the cold end of the temperature difference power generation sheet 103 via the cold-end heat-conducting layer 105, and a large number of heat dissipation particles are distributed on the surface of the other side to expand the surface area of heat dissipation, so as to cool down the cold end of the temperature difference power generation sheet 103 quickly.

The light-heat-kinetic-RF fusion energy-harvesting device 2 realizes the integration of a photovoltaic power generation unit, a temperature difference power generation unit, a kinetic energy harvesting unit, and an RF energy harvesting unit, for harvesting light energy, heat energy, mechanical energy, and electromagnetic wave energy ubiquitous in the environment in which the system is located. Further, as shown in FIG. 2, the light-heat-kinetic-RF fusion energy-harvesting device 2 is formed by sequentially and tightly attaching a solar cell sheet 101, a hot-end heat-conducting layer 102, a temperature difference power generation sheet 103, an RF antenna 104, a cold-end heat-conducting layer 105, and a piezoelectric array cooling sheet. The piezoelectric array cooling sheet, as shown in FIG. 3, is formed by an aluminum substrate base 201, a transverse piezoelectric fin array 202, and a vertical piezoelectric fin array 203.

The solar cell sheet 101, the hot-end heat-conducting layer 102, the temperature difference power generation sheet 103, the RF antenna 104, and the cold-end heat-conducting layer 105 are the same components as those in the light-heat-RF fusion energy-harvesting device 1.

In a preferred solution of the present disclosure, the smooth surface of the aluminum substrate base 201 of the piezoelectric array cooling sheet is bonded to the cold end of the temperature difference power generation sheet 103 via the cold-end heat-conducting layer 105, and the connection between the cold end of the temperature difference power generation sheet 103 and the piezoelectric array cooling sheet can be reinforced by auxiliary fasteners such as plate clamp holders in a vibration-intensive environment. The non-smooth surface of the piezoelectric array cooling sheet is deployed with a transverse piezoelectric sheet array 202 and a vertical piezoelectric fin array 203 as cooling fins in a checkerboard pattern to increase the heat dissipation area.

Further, under vibrational excitation in the environment, the piezoelectric sheet arrays 202 and 203 may sense and vibrationally deform in the transverse and vertical checkerboard grid space, converting mechanical energy in the environment into electric energy while accelerating the circulation of the airflow around the piezoelectric cooling fins to improve the heat dissipation efficiency.

Further, the piezoelectric sheet 204 is encapsulated or coated with an insulating and heat-conducting material 205, welded to the aluminum substrate base 201 of the piezoelectric array cooling sheet via the bonding pads of piezoelectric sheet electrode at the bottom thereof, and loaded with magnets, rectifier pieces, etc. at its head as a mass block 206 for improving the response and frequency characteristics of vibration to improve the efficiency of mechanical energy harvesting.

The heat-dissipating circuit board 3 is formed by bonding sequentially and tightly a circuit board 301, a heat-conducting layer 302, and a plurality of cooling fins 303. The circuit board 301 serves to deploy energy storage elements and electric energy power management circuits. The heat-conducting layer 302 and the heat-dissipating fins 303 increase the heat dissipation area to cool an interior of the system.

Further, the circuit board 301 is in hollow-carved design, providing a good airflow circulation loop for vibration of the piezoelectric array cooling sheet.

Further, the energy storage element is a flexible super-capacitor, an ordinary super-capacitor, a lithium battery or a storage battery, and serves for storing the electric energy harvested by the system.

Further, the electric energy management circuit serves to manage and control the electric energy converted from the fused and harvested ubiquitous energy, and integrate an open output interface to provide electric energy to external loads.

In a preferred solution of the present disclosure, bonding surfaces between the heat-transferring parts are provided with a heat-conducting layer to ensure that the bonding surfaces can be in close contact with each other, reduce the heat resistance and enhance the heat-conducting effect.

In summary according to the accompanying drawings, the above is only a preferred example of the present disclosure, and is not intended to limit the scope of protection of the present disclosure. Any modifications, equivalent replacements and improvements made within the spirit and principle of the present disclosure are included in the scope of protection of the present disclosure.

The invention claimed is:

1. An energy-harvesting system, comprising light-heat-radio frequency (RF) energy-harvesting devices, light-heat-kinetic-RF energy-harvesting devices, and a circuit board, a total of six pieces of the light-heat-RF energy-harvesting devices, the light-heat-kinetic-RF energy-harvesting devices and a heat-dissipating circuit board being spliced to form a hexahedral structure, wherein the light-heat-RF energy-harvesting devices serve to realize photovoltaic power generation, temperature difference power generation, and RF energy power generation, the light-heat-kinetic-RF energy-harvesting devices serve to realize photovoltaic power generation, temperature difference power generation, RF energy power generation, and kinetic energy power generation, and the circuit board serves to deploy energy storage elements and electric energy management circuits, and manage and store electric energy generated by the light-heat-RF energy-harvesting devices and the light-heat-kinetic-RF energy-harvesting devices.

2. The energy-harvesting system according to claim 1, wherein in the hexahedral structure, the number of the light-heat-kinetic-RF energy-harvesting devices is 1 or 2, the number of the circuit board is 1, and the rest are the light-heat-RF energy-harvesting devices.

3. The energy-harvesting system according to claim 1, wherein the light-heat-RF energy-harvesting device is formed by sequentially and tightly attaching a solar cell sheet, a hot-end heat-conducting layer, an RF antenna, a temperature difference power generation sheet, a cold-end heat-conducting layer, and a cooling sheet.

4. The energy-harvesting system according to claim 2, wherein the light-heat-RF energy-harvesting device is formed by sequentially and tightly attaching a solar cell sheet, a hot-end heat-conducting layer, an RF antenna, a temperature difference power generation sheet, a cold-end heat-conducting layer, and a cooling sheet.

5. The energy-harvesting system according to claim 3, wherein an expansion area is arranged around the temperature difference power generation sheet, and the RF antenna is arranged on the expansion area.

6. The energy-harvesting system according to claim 1, wherein the light-heat-kinetic-RF energy-harvesting device is formed by sequentially and tightly attaching a solar cell sheet, a hot-end heat-conducting layer, an RF antenna, a temperature difference power generation sheet, a cold-end heat-conducting layer, and piezoelectric array cooling sheets; each of the piezoelectric array cooling sheets comprises an aluminum substrate base, a transverse piezoelectric fin array and a vertical piezoelectric fin array; and the transverse piezoelectric fin array and the vertical piezoelectric fin array are deployed on one side of the aluminum substrate base in a checkerboard pattern.

7. The energy-harvesting system according to claim 2, wherein the light-heat-kinetic-RF energy-harvesting device is formed by sequentially and tightly attaching a solar cell sheet, a hot-end heat-conducting layer, an RF antenna, a temperature difference power generation sheet, a cold-end heat-conducting layer, and piezoelectric array cooling sheets; each of the piezoelectric array cooling sheets comprises an aluminum substrate base, a transverse piezoelectric fin array and a vertical piezoelectric fin array; and the transverse piezoelectric fin array and the vertical piezoelectric fin array are deployed on one side of the aluminum substrate base in a checkerboard pattern.

8. The energy-harvesting system according to claim 5, wherein a piezoelectric fin comprises a piezoelectric sheet and a mass block; and the piezoelectric sheet is encapsulated or coated with an insulating and heat-conducting material, with a bottom of the piezoelectric sheet being fixedly connected to the aluminum substrate base, and a head thereof being loaded with the mass block.

9. The energy-harvesting system according to claim 1, wherein a plurality of cooling fins are tightly bonded to a back face of the heat-dissipating circuit board via a heat-conducting layer, and the heat-dissipating circuit board serves to deploy the energy storage elements and the electric energy management circuits.

10. The energy-harvesting system according to claim 2, wherein a plurality of cooling fins are tightly bonded to a back face of the heat-dissipating circuit board via the heat-conducting layer, and the heat-dissipating circuit board serves to deploy the energy storage elements and the electric energy management circuits.

11. The energy-harvesting system according to claim 7, wherein the heat-dissipating circuit board is in a hollow-carved design.

12. The energy-harvesting system according to claim 7, wherein each of the energy storage elements is a flexible super-capacitor, an ordinary super-capacitor, a lithium battery or a storage battery, for storing electric energy harvested by the energy-harvesting system.

13. The energy-harvesting system according to claim 3, wherein an aluminum substrate is used as a base for a hot end of the temperature difference power generation sheet.

14. The energy-harvesting system according to claim 4, wherein an aluminum substrate is used as a base for a hot end of the temperature difference power generation sheet.

15. The energy-harvesting system according to claim 6, wherein an aluminum substrate is used as a base for a hot end of the temperature difference power generation sheet.

16. The energy-harvesting system according to claim 7, wherein an aluminum substrate is used as a base for a hot end of the temperature difference power generation sheet.

17. The energy-harvesting system according to claim 3, wherein the RF antenna is designed with a multi-layer printed circuit board (PCB) to provide a continuous and uniform ground plane below the RF antenna, with an impedance matching network arranged at a bottom layer; and the RF antenna is-typically designed as a patch antenna in a shape of a combination of Koch curves and geometrical curves, or as a micro-strip antenna, depending on the frequency of RF signals in the environment.

18. The energy-harvesting system according to claim 4, wherein the RF antenna is designed with a multi-layer printed circuit board (PCB) to provide a continuous and uniform ground plane below the RF antenna, with an impedance matching network arranged at a bottom layer; and the RF antenna is typically designed as a patch antenna in a shape of a combination of Koch curves and geometrical curves, or as a micro-strip antenna, depending on the frequency of RF signals in the environment.

19. The energy-harvesting system according to claim 6, wherein the RF antenna is designed with a multi-layer printed circuit board (PCB) to provide a continuous and uniform ground plane below the RF antenna, with an impedance matching network arranged at a bottom layer; and the RF antenna is designed as a patch antenna in a shape of a combination of Koch curves and geometrical curves, or as a micro-strip antenna, depending on the frequency of RF signals in the environment.

20. The energy-harvesting system according to claim 7, wherein the RF antenna is designed with a multi-layer printed circuit board (PCB) to provide a continuous and uniform ground plane below the RE antenna, with an impedance matching network arranged at a bottom layer; and the RF antenna is designed as a patch antenna in a shape of a combination of Koch curves and geometrical curves, or as a micro-strip antenna, depending on the frequency of RF signals in the environment.

* * * * *